(12) United States Patent
Forkel et al.

(10) Patent No.: US 6,918,633 B2
(45) Date of Patent: Jul. 19, 2005

(54) SUPPORT ELEMENT FOR UPHOLSTERING ON A VEHICLE SEAT

(75) Inventors: Michael Forkel, Coburg (DE); Andrea Bayersachs, Ebersdorf (DE); Peter Rausch, Niederfüllbach (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 10/484,992

(22) PCT Filed: Sep. 9, 2002

(86) PCT No.: PCT/DE02/03411

§ 371 (c)(1),
(2), (4) Date: Jan. 26, 2004

(87) PCT Pub. No.: WO03/022626

PCT Pub. Date: Mar. 20, 2003

(65) Prior Publication Data

US 2004/0160100 A1 Aug. 19, 2004

(30) Foreign Application Priority Data

Sep. 7, 2001 (DE) .......................... 101 45 206

(51) Int. Cl.⁷ ................................. B60N 2/66
(52) U.S. Cl. ................................. 297/284.4
(58) Field of Search ................ 297/284.1, 284.4, 297/284.7, 284.8

(56) References Cited

U.S. PATENT DOCUMENTS

| | | |
|---|---|---|
| 5,299,851 A | 4/1994 | Lin |
| 5,518,294 A | 5/1996 | Ligon, Sr. et al. |
| 5,641,205 A | 6/1997 | Schmidt |
| 5,651,583 A | 7/1997 | Klingler et al. |
| 5,868,466 A | 2/1999 | Massara et al. |
| 5,913,569 A * | 6/1999 | Klingler .................. 297/284.4 |
| 5,954,399 A | 9/1999 | Hong |
| 6,189,972 B1 * | 2/2001 | Chu et al. ................ 297/284.4 |
| 6,296,308 B1 * | 10/2001 | Cosentino et al. ....... 297/284.4 |
| 6,631,951 B2 * | 10/2003 | Blendea et al. .......... 297/284.4 |

FOREIGN PATENT DOCUMENTS

| | | |
|---|---|---|
| DE | 36 19 188 C1 | 12/1987 |
| DE | 42 32 679 C1 | 2/1994 |
| DE | 198 25 225 A1 | 12/1999 |
| DE | 201 21 283 U1 | 8/2002 |
| EP | 0 754 590 A2 | 1/1997 |

OTHER PUBLICATIONS

English translation of International Preliminary Examination Report of PCT/DE2002/003411, dated May 20, 2003.
International Search Report of PCT/DE02/03411, dated Feb. 17, 2003.
International Preliminary Examination Report of PCT/DE02/03411, dated May 20, 2003.

* cited by examiner

Primary Examiner—Peter R. Crown
(74) Attorney, Agent, or Firm—Christie, Parker & Hale, LLP

(57) ABSTRACT

A support element for upholstering on a vehicle seat, in particular for the backrest upholstery, with a base region of large area, for supporting the upholstery and an edge surrounding the base region. At least two separate adjacent support regions are provided along the edge of the base region, projecting from the edge.

28 Claims, 8 Drawing Sheets

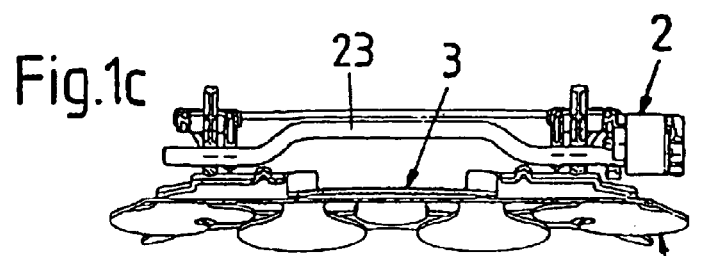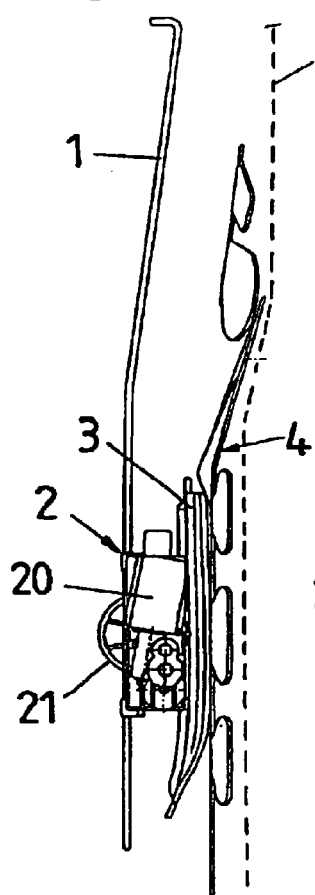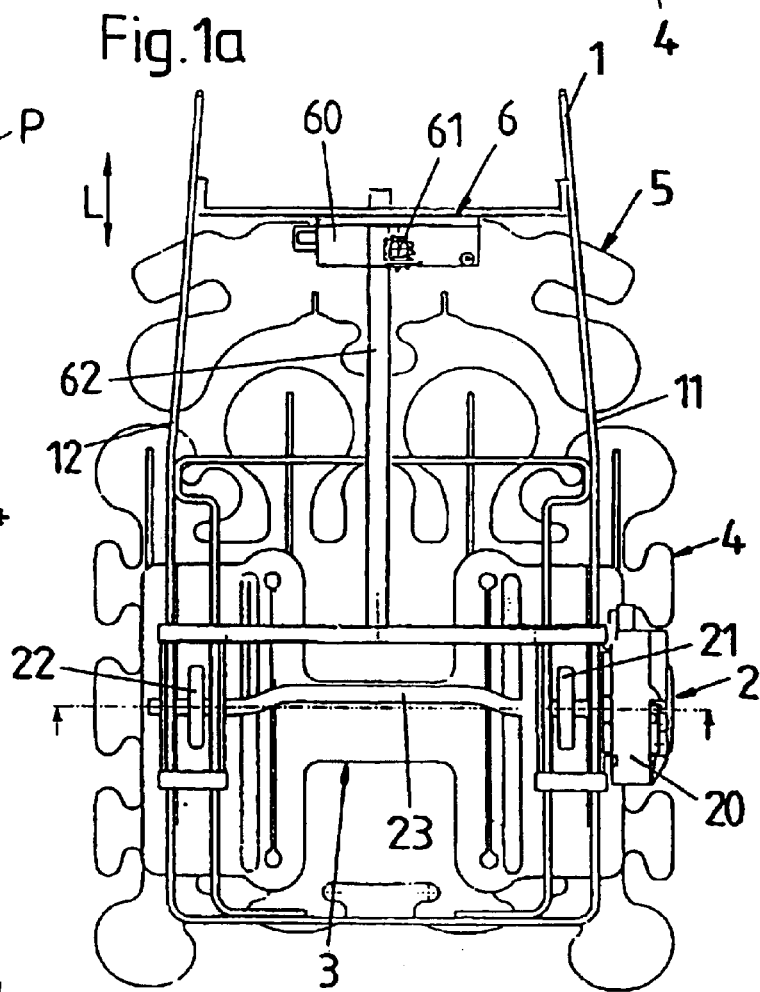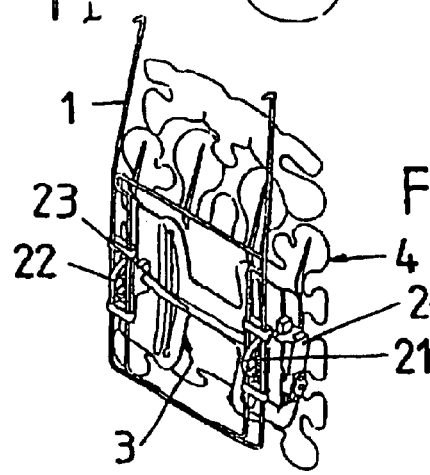

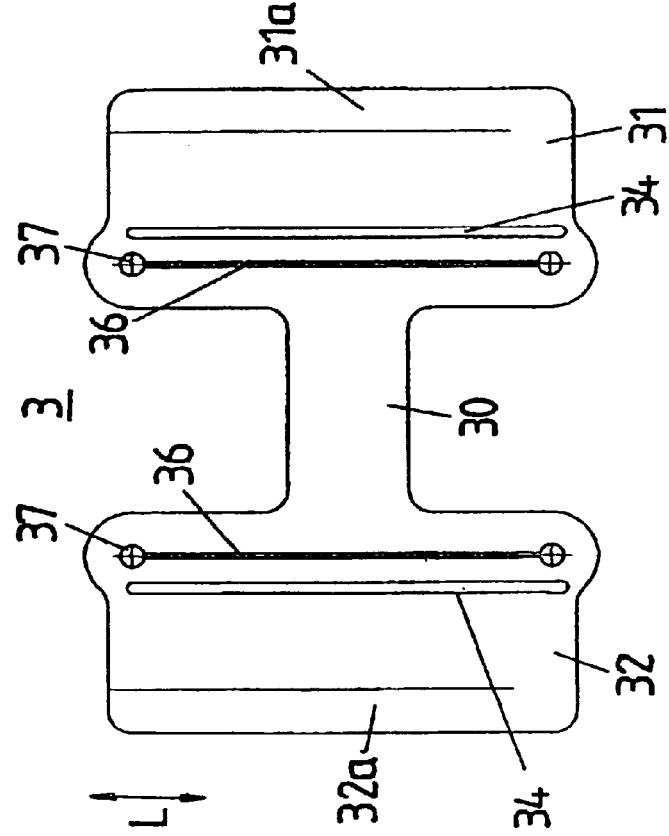
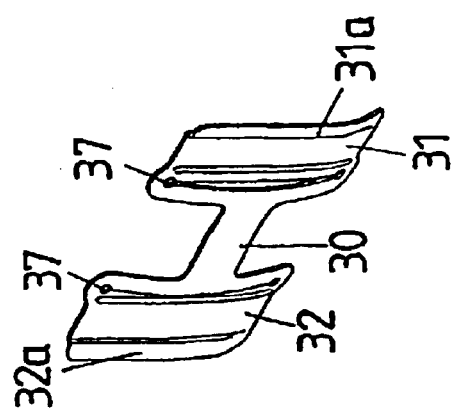

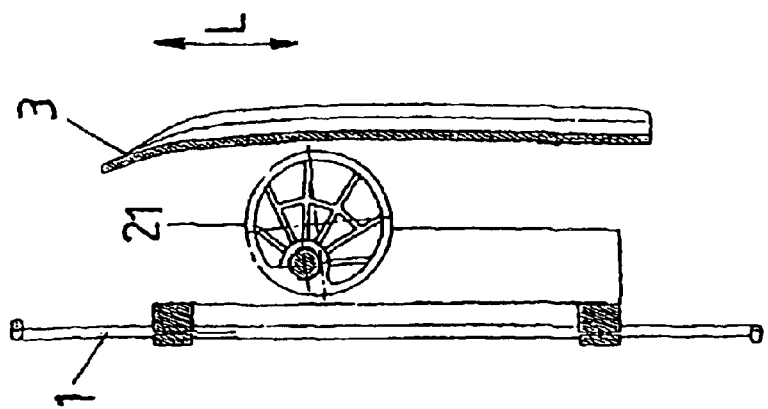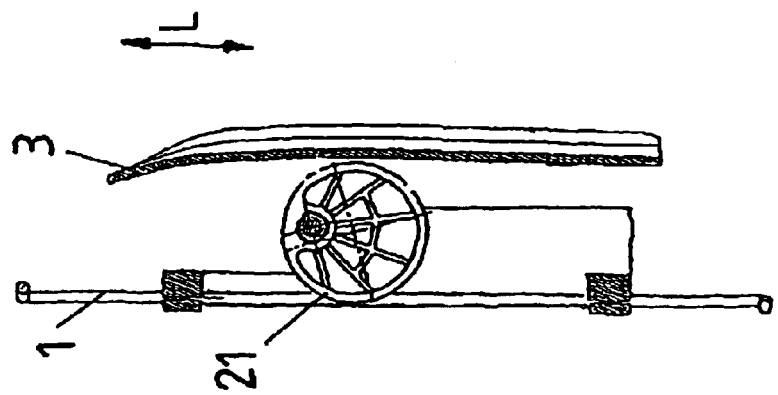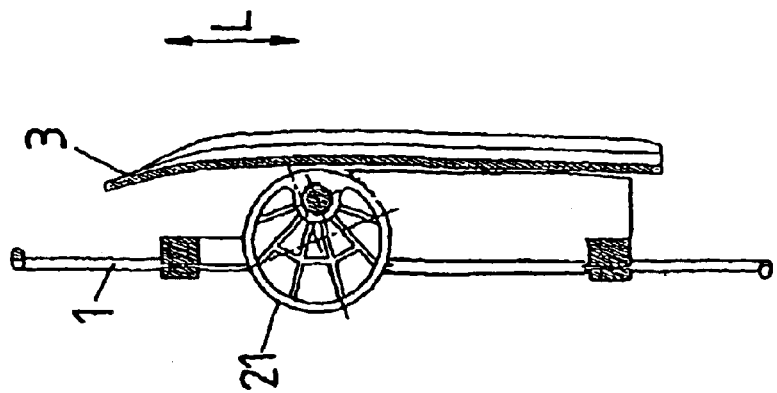

SUPPORT ELEMENT FOR UPHOLSTERING ON A VEHICLE SEAT

CROSS-REFERENCE TO RELATED APPLICATION

This application is a National Phase Patent Application of International Application Number PCT/DE02/03411, filed on Sep. 9, 2002, which claims priority of German Patent Application Number 101 45 206.3, filed on Sep. 7, 2001.

BACKGROUND

The invention relates to a support element for upholstering on a vehicle seat.

A support element of this kind comprises a large surface area base region which is designed and provided for fitting on the back of the upholstery and which is set up to take up and distribute the compressive forces which occur when a vehicle occupant leans on the front side of the upholstery. A support element of this kind is provided in particular for fitting between the backrest upholstery of a vehicle seat and a curved element which extends along the back of the backrest upholstery and whose position and/or curvature can be adjusted by means of an adjusting device in order to be able to adapt the curvature of the backrest upholstery to the needs of the various different vehicle occupants.

A backrest for vehicle seats is known from DE 36 19 188 C1 where the upholstery padding can be adjusted by means of a curved element in the form of two leaf springs wherein a pressure distributing plate is mounted between the leaf springs and the padding.

By fitting a support element e.g. in the form of a pressure distributor plate between the curved element and the backrest padding, the curved element does not act on the upholstery direct but rather through the support element which is designed so that—even with a more marked curvature of the curved element—it ensures a large surface ergonomic support of the back region of the vehicle occupant. More particularly it is achieved through the large surface area support element that during each adjustment of the curved element the support for the back of the relevant vehicle occupant adapts to the contour of the relevant back region, i.e.,—the curvature of a sufficiently flexible (elastically arching) support element is determined not only by the adjustment of the curved element but also at the same time by the contour of the back part of the relevant vehicle occupant and is thereby adapted ergonomically in optimum manner.

SUMMARY

The object of the invention is to improve a support element for upholstering on a vehicle seat, more particularly the sitting comfort for a vehicle occupant.

According to this a number of separate support regions protrude next to each other from the edge of the large surface base region of the support element. It has been seen that by arranging additional support regions (support contour fingers) in this way along the edge of the large surface base region of the support element (preferably moulded on the base region) a particularly uniform support of the back region of an occupant can be achieved with a particularly good adaption to his/her back part, independently of the relevant setting of the curved element.

By adjacent arrangement of at least two support regions along the edge is thereby to mean that the two support regions are arranged adjacent along one spatial direction along which the edge extends between the two said support regions. The two support regions can in particular be mounted adjacent one edge section which runs along the said spatial direction.

Particularly preferred are at least three support regions which are arranged in succession along one edge section and are thereby arranged in pairs side by side.

The support regions can simply be formed by projections moulded in one piece on the edge of the base region. Through the arrangement according to the invention of several support regions along the edge of the base region which each project from the base region, the support element has a particular elasticity (raised compared with the central base region) in the region of its edge so that the possibility of adapting the support element to the back part of an occupant is improved. The support element overall is preferably formed so that it can arch.

In particular the support regions are spaced out from each other along the edge of the base region of the support element so that they are each only connected to the base region but not additionally however to each other.

Alternatively it can be proposed that individual more particularly adjacent support regions are connected together through (loose) material regions which do not (significantly) restrict the mobility of the individual support regions relative to each other, thus do not impair the elasticity of the support regions.

Furthermore adjacent support regions can overlap one another. The overlapping support regions are then however preferably each connected to the base region through connecting regions which are spaced from each other along the edge of the base region.

The connection of the support regions to the base region is through a connecting region which tapers from the support region to the base region at least in sections, e.g. is formed in sections as a web. With a connecting region which protrudes from the base region along a first direction, e.g. substantially perpendicular to the edge of the base region, this means that the width of the connecting region, i.e. its extension perpendicular to the first direction is smaller than the maximum width of the support region on that side of the connecting region. A special elasticity of the support regions is hereby ensured and thus a particularly good adaptability to the relevant vehicle occupant.

The support regions can extend substantially in the same plane in which the associated edge region of the base region of the support element lies or, particularly preferred, can run at an obtuse angle to that plane so that at least one part of the support regions is angled towards the upholstering. The support action of the support element is hereby further improved, particularly with regard to a uniform absorption and distribution of the compressive forces.

With a substantially rectangular large surface base region of the support element the base region has four edge sections which are each opposite one another in pairs whereby a number of spaced support regions is provided on at least one of the edge sections. In relation to the installation position of the support element in a vehicle seat having an upright backrest the support regions can for example be provided on the upper and/or lower edge section as well as on one or preferably both side edge sections.

According to a further development of the invention the support element has reinforcement regions, more particularly in the form of swages or ribs, as well as where necessary weakened areas, more particularly in the form of openings or slits in order to achieve a defined pressure path which is evened out over the entire surface of the support element. The reinforcement regions can thereby extend into the base regions provided at the edge of the support element, namely preferably so that the rigidity of the corresponding support region decreases towards its free end (remote from the edge of the base region).

In the case of support regions which protrude from the lower edge section of the base region of a support element for backrest upholstery it can be advantageous to dispense with reinforcement regions if a particularly flexible formation of the support element is to prevent too much pressure on the spine of the occupant.

Furthermore in a preferred embodiment the support regions can be formed rotatable spring elastically about an axis which is defined through an elongated reinforcement region, e.g. in the form of a rib.

According to an advantageous development of the invention support regions of different size are arranged alternately along the edge of the base region, e.g. support regions of a first size and of a second size different herefrom are arranged alternately (in relation to their surface area in the plane of the support element) and are thereby boxed in each other. A large supporting surface area with advantageous elastic properties is hereby to be provided for example in the shoulder blade region of the occupant. Correspondingly an arrangement of this kind is to be provided particularly in the region of the upper edge section of a support element for a backrest upholstering.

The external contour i.e. the edge of the support regions which are mounted on the base region and which for example are formed integral therewith is preferably curved, i.e. free of sharp corners whereby particularly advantageous supporting properties are achieved.

According to a further development of the invention support regions are provided in the corner sections of the base region of the support element and have in relation to a rotational axis which can be formed for example by a reinforcement region, an asymmetrical division of the surface area, whereby the smaller surface points outwards, i.e. away from the support element and the larger surface points towards further support regions of the support element. The corresponding support region is hereby turned when under stress so that the outward facing outer surface region is moved forwards and the lateral hold of an occupant is hereby improved. The asymmetrical surface division required for this can be achieved for example in that an additional inwardly directed support finger is provided on the corresponding support region or that the inwardly directed surface section is enlarged in some other way relative to the outwardly directed surface section so that the inwardly directed lever arm of the support surface is greater than the outwardly directed lever arm.

For further levelling out the compressive forces the support element can have pressure distributing regions, more particularly in the form of through openings.

In a preferred embodiment the backrest has a curved element which extends along the back of the backrest upholstery, as well as an adjusting device with which the position and/or curvature of the curved element can be adjusted in order to adjust the curvature of the backrest upholstery. The support element hereby extends between the curved element and the backrest upholstery so that it is in active connection with the curved element on one side and bears against the backrest upholstery at least in sections on the other side.

In order to adjust the curvature of the backrest upholstery the adjusting device associated with the curved element has at least one adjusting element, e.g. in the form of an eccentric which can be brought into active connection with the curved element and hereby acts on the support element of the backrest upholstery through the curved element.

Both the curved element and the support element can each be fixed at selected points, more particularly in the region of their upper and lower edges on the backrest frame. The associated adjusting device can depending on the setting generate a defined curvature of the curved element or support element between the fixing points. Decisive for an ergonomic support of the back of an occupant therefore is in particular the curving properties of the support element. The curved element thereby serves to couple the support element to the associated adjusting device. This can happen both through a curvature and through a displacement of the curved element when actuating the adjusting device whereby the displacement takes place across the plane of the backrest frame.

The curvature of the support element is thereby however not only determined by the setting of the adjusting device but in particular also by the contour of the back region and by the weight of the occupant seated on the seat.

The curved element has in the areas in which it can be brought into contact with an adjusting element of the adjusting device, a greater rigidity than in the region which bears against the backrest. On the one hand it is hereby ensured that the curved element can take up the adjusting forces of the associated adjusting device and direct them to the support element and on the other hand a sufficiently flexible contact bearing of the curved element against the support element is achieved.

According to another embodiment the curved element has two elongated side regions of increased rigidity which are connected together through a central region of the curved element. The central region can be formed for example as a transverse bar or stay and is connected to the support element. To separate the regions of increased stiffness from the at least one region of lesser stiffness weakened areas in the form of slits can be provided. Reinforcement ribs or reinforcement swages are suitable for example to provide regions of increased rigidity in the curved element.

The support element is preferably formed with a larger surface area in its extension plane than the curved element.

Any elements can serve as adjusting elements which act on the curved element provided they allow the desired adjustment of the curved element, e.g. eccentric discs, or draw means in the form of cables or wires.

BRIEF DESCRIPTION OF THE DRAWINGS

Further features and advantages of the invention will now be explained in further detail with reference to the embodiment illustrated in the drawings.

They show:

FIGS. 1a to 1d four different views of a backrest frame with a curved element fixed thereon which can be adjusted by means of a drive and with a large surface support element mounted in front of the curved element;

FIGS. 3a to 3d four different views of the curved element of FIGS. 1a to 1d;

FIGS. 5a to 5c a diagrammatic view of the arrangement of FIGS. 1a to 1d in three different settings of the adjusting device for the curved element;

DETAILED DESCRIPTION

Figure 2A:
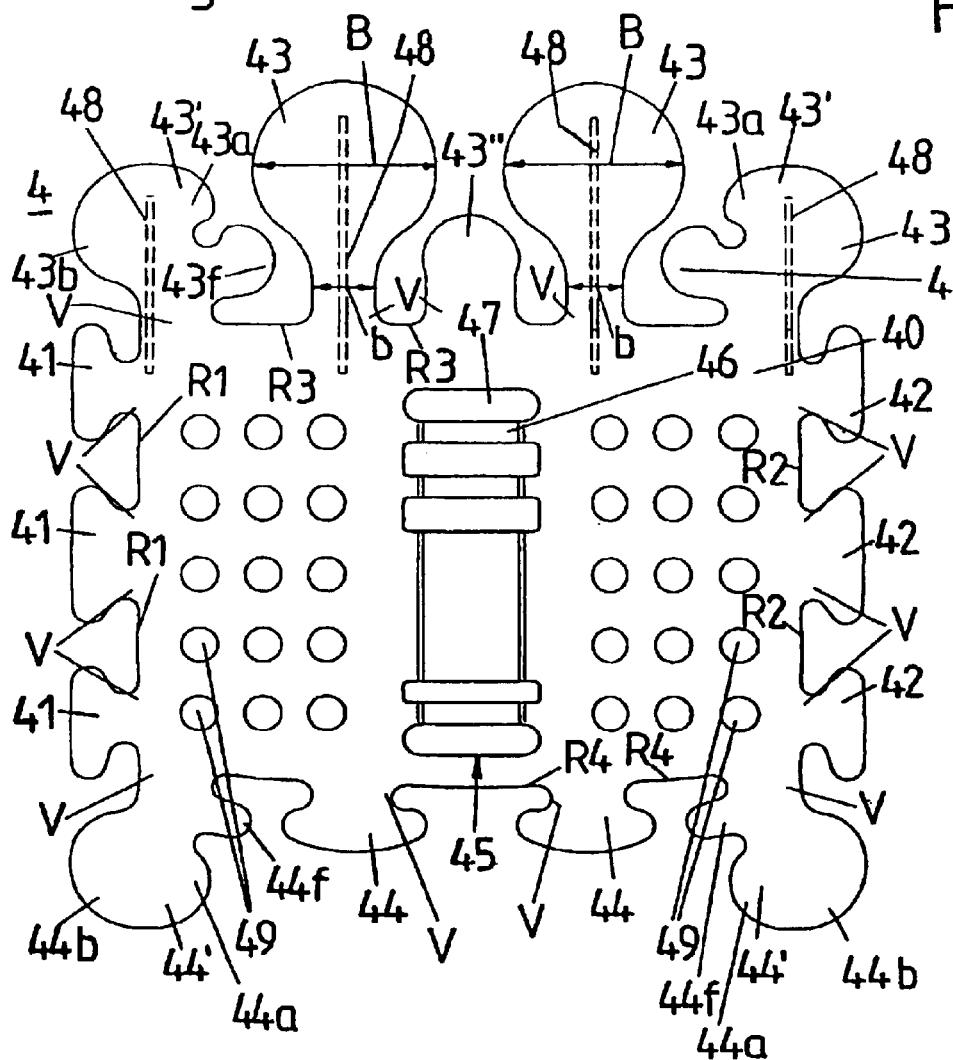
FIGS. 2a to 2d four different views of the support element of FIGS. 1a to 1d.

In the overall view according to FIGS. 1a to 1d and the individual illustrations according to FIGS. 2a to 2d, 3a to 3d and 4a to 4c, the back rest is shown for a vehicle seat having a backrest frame 1 on which a curved element 3 is mounted for producing an adjustable lordosis support, with the curvature adjustable by means of an adjusting device 2. Of the backrest frame only a wire grid is shown which is hung from the backrest frame and on which the adjusting device 2 is fixed.

The curved element 3 consists of two side sections 31, 32 extended in the backrest longitudinal direction L and a cross bar 30 connecting these sections 31, 32 together and extending across the backrest longitudinal direction L. The two side sections 31, 32 of the curved element 3 each have a reinforcement swage 34 and are thereby stiffer than the flexible cross bar 30.

To uncouple the two side sections 31, 32 of the curved element 3 from the central cross bar 30, two longitudinal slits 36 are provided which extend on the side of the relevant side section 31, 32 of the curved element 3 facing the cross bar 30. These slits 36 are each formed circular at their ends 37.

An additional reinforcement of the side sections 31, 32 of the curved element 3 is thereby reached in that the side sections 31, 32 are angled substantially L-shaped at their outer edges 31a, 32a. This deformation of the edge areas 31a, 32a increases the stability of the reinforcement regions 31, 32 in a similar manner to the reinforcement swages 34.

For adjusting the position and/or curvature of the curved element 3 there is an electric adjusting device 2 with two eccentric discs 21, 22 driven by a common drive 20 and connected together through a shaft 23. By turning the eccentric discs 21, 22 it is possible to adjust the distance of the curved element 3 from the backrest frame across the extension plane of the curved element 3, see FIGS. 5a to 5c. Adjusting the distance is thereby carried out by turning the eccentric discs 21, 22 by means of the electric drive 20 via the shaft 23 driven by the drive. 20 and on which the two eccentric discs 21, 22 are mounted rotationally secured.

Whether the change in the distance between the backrest frame 1 and the curved element 3 in the initial instance leads to a curvature of the curved element 3 or substantially to a displacement of the curved element 3 transversely to the longitudinal direction L of the backrest depends on the arrangement of the curved element 3 in relation to the backrest frame 1.

In the diagrammatic views according to FIGS. 5a to 5c, the curved element 3 is mounted displaceable relative to the seat frame 1 transversely to the longitudinal direction L of the backrest. An adjustment of the eccentric discs 21, 22 leads in this case to a displacement of the curved element 3 transversely to the backrest longitudinal direction L.

Figure 6:
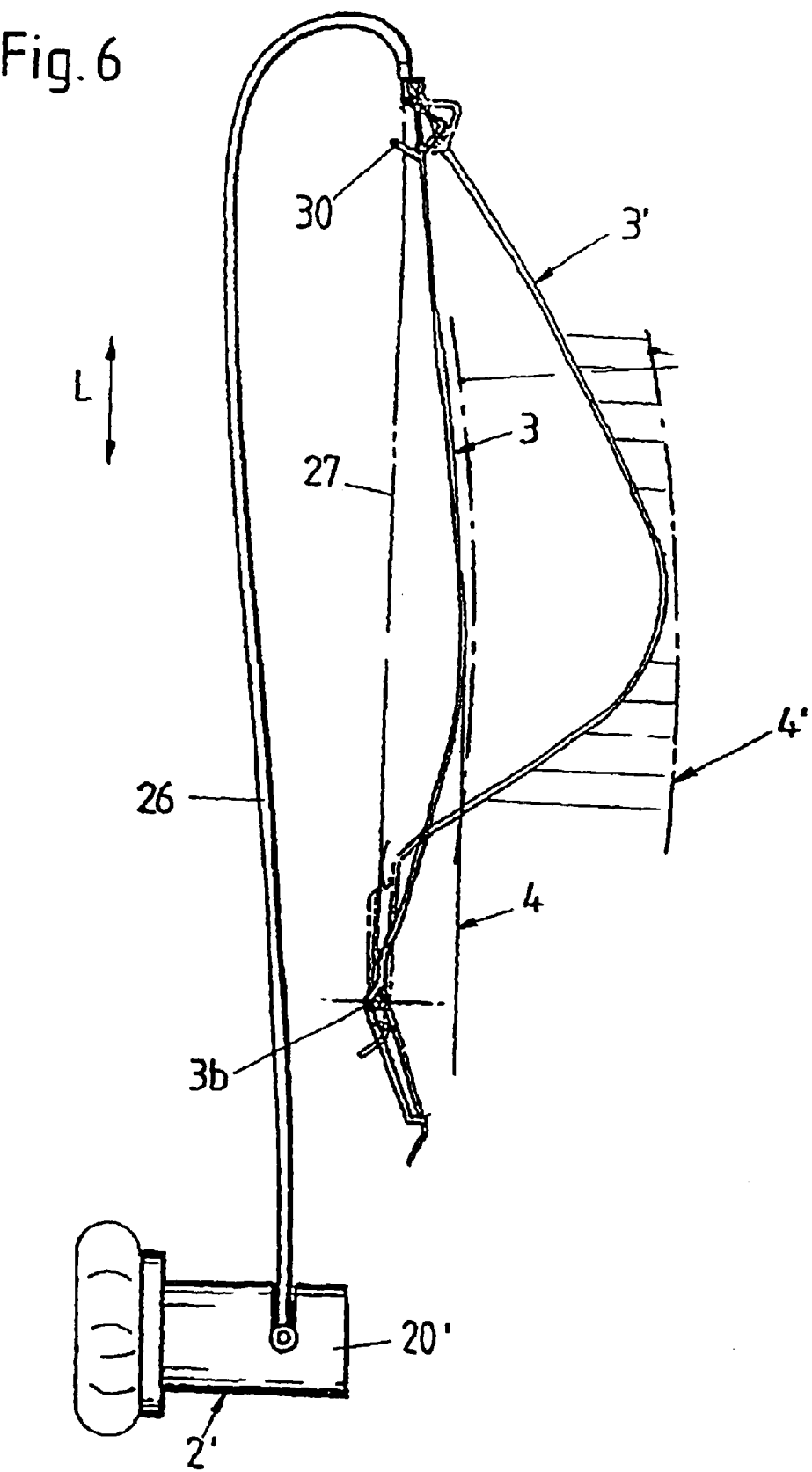
FIG. 6 shows a modification of the embodiment of FIGS. 1a to 2d in respect of the adjusting device.

If the curved element 3 on the other hand is fixed by its upper and lower ends directly on the backrest frame L, see here the following comments on FIG. 6, then an adjustment of the eccentric discs 21, 22 causes mainly a change in the curvature of the curved element 3.

According to the present invention the curved element 3 is not provided directly for bearing against the upholstery of the backrest, but an additional support element 4 extends in front of the curved element 3 and thus between the curved element 3 and seat upholstery of the seat back so that there is no direct action of the curved element 3 on the backrest cushion. The position of the backrest upholstery P is shown diagrammatically in FIG. 1b.

The support element 4 which is to be mounted in front of the curved element 3 in the form of a backrest shell comprises an elastically curving base body 40 with a large surface area as base region which is provided with a number of openings 49. These openings 49 in the form of through apertures form pressure distributing regions which prevent the buildup of pressure at individual points on the support element 4 and which produce the most even pressure path possible acting over the entire surface area of the base region 40.

The base region 40 of the support element 4 is surrounded by an edge R1, R2, R3, R4 which is formed by opposite pairs of edge sections R1, R2 and R3, R4. In relation to the installation position of the support element 4 in a vehicle seat when the backrest is set up vertical, these edge sections form two side edge sections R1 and R2, an upper edge section R3 and a lower edge section R4.

Support regions 41 to 44 are moulded on the side edges R1, R2 and on the upper and lower edge R3, R4 of the support element 4 in the backrest longitudinal direction L and are each connected through connecting webs V in one piece with the base region 40 of the support element 4. The connecting webs V associated with the support regions 41 to 44 thereby have transversely to their extension direction (connecting direction from the relevant support region 41, 42, 43 and 44 to the large surface base region 40) a smaller extension than the supporting regions 41 to 44 themselves, i.e., the width b of the webs (corresponding to the extension of the webs perpendicular to the connecting direction defined at the top) is less than the corresponding width B of the individual support regions 41, 42, 43, 44 in this direction.

These one piece moulded support regions 41 to 44 act as support contour fingers which aligned in position uniformly support the side and upper and lower back regions and which as a result of the connecting webs of reduced width b are sufficiently elastic to adapt to the contour of the back of the occupant in dependence on the sitting position of same.

Figure 2B:
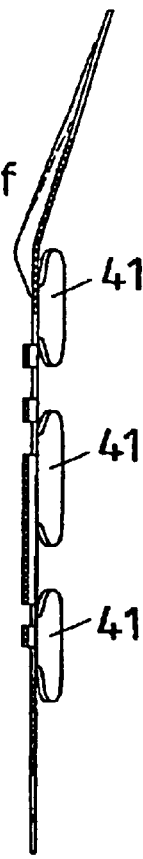
Figure 2C:
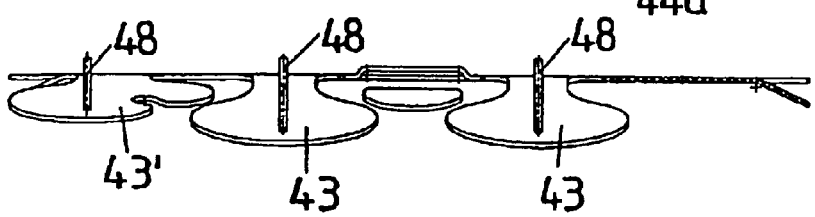
Figure 2D:
Figure 4A:
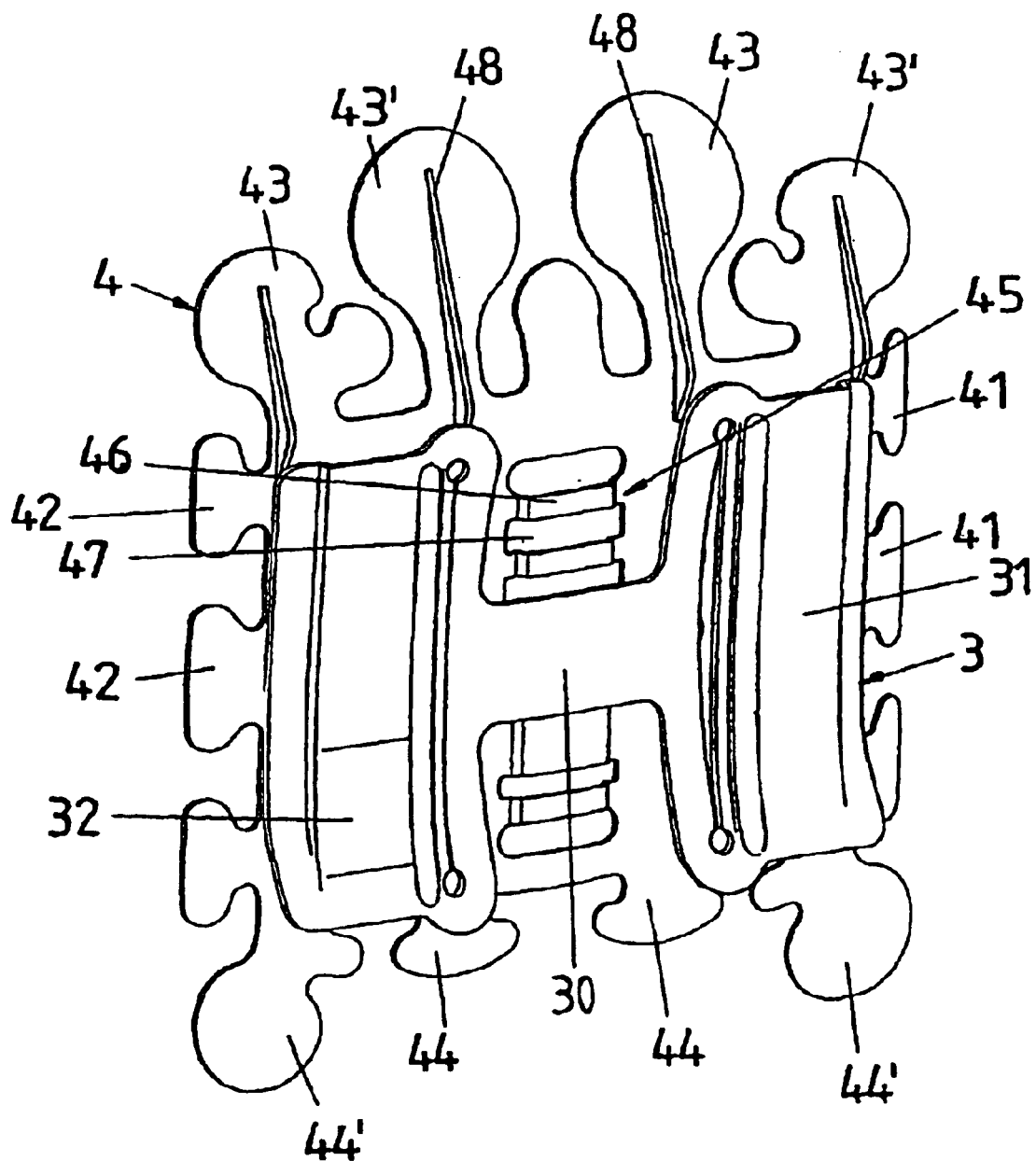
FIGS. 4a to 4c three different views of the curved element and support element of FIGS. 1a to 2d wherein these are connected together.
Figure 4B:
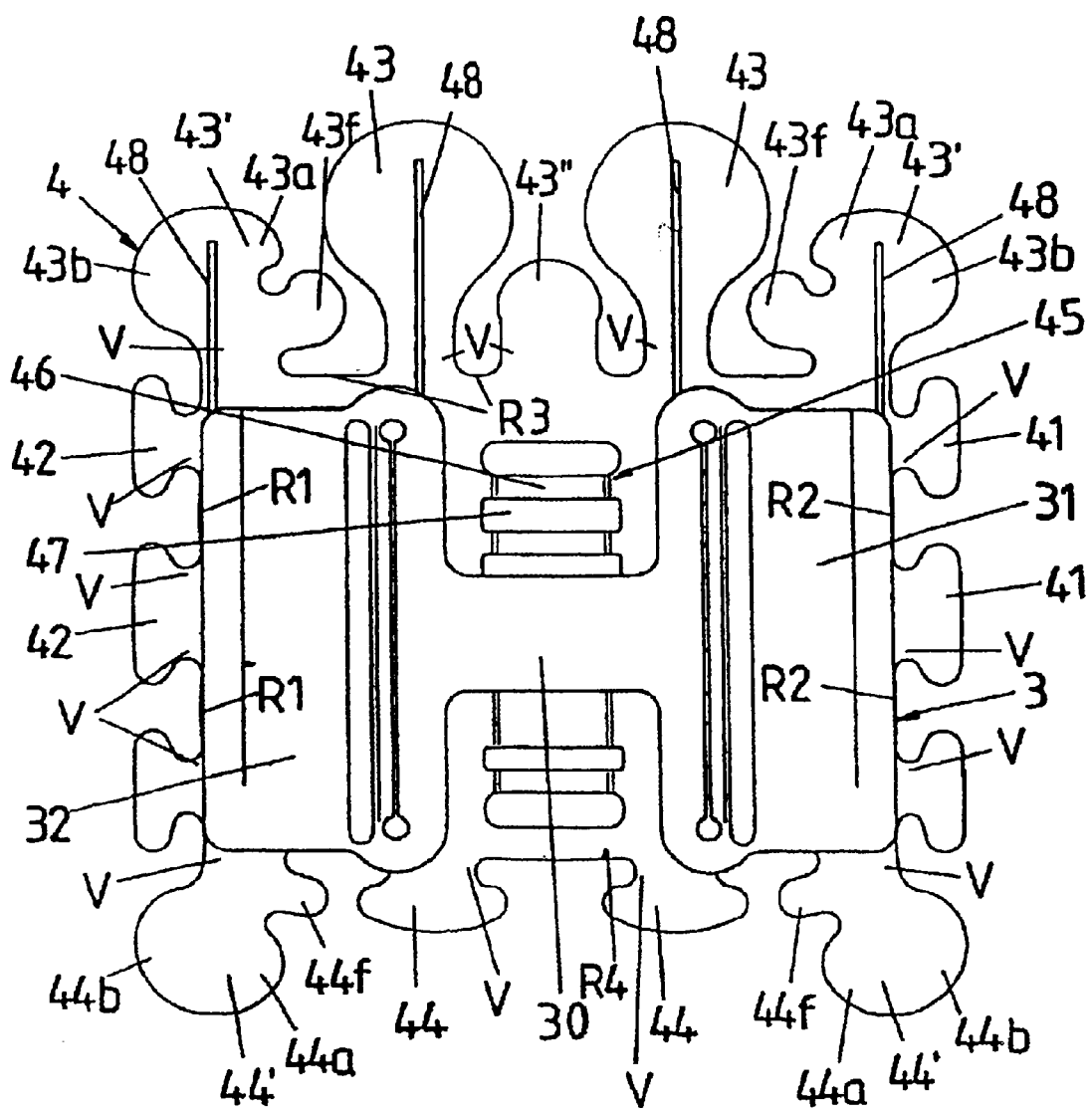
Figure 4C:
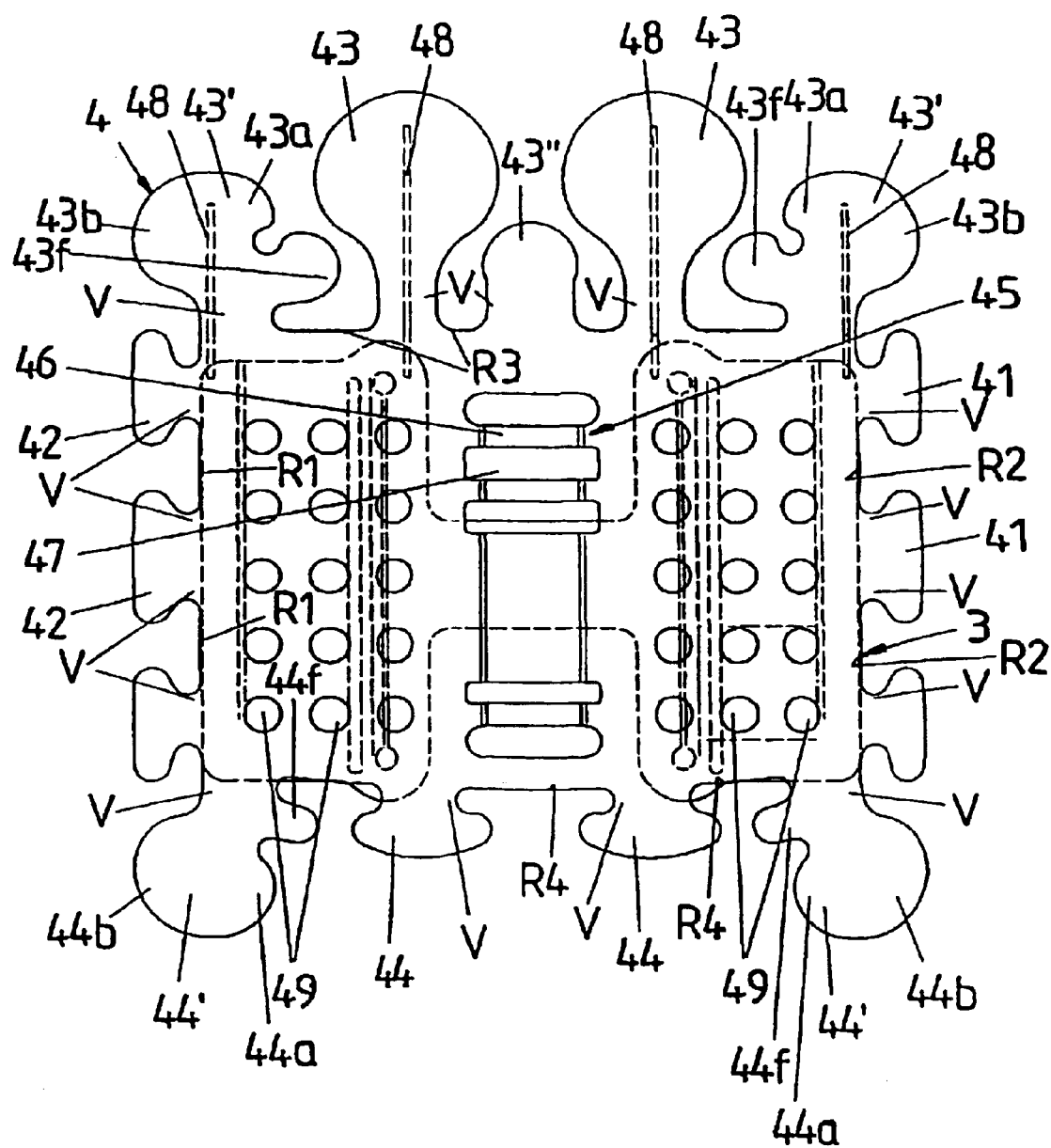

Particularly from FIGS. 2b to 2d and from FIG. 4a it can be seen that the support regions 41,42, 43, 43', 43", 44, 44' are each inclined at an obtuse angle to the extension plane of the base region 40 of the support element 4. The support regions 41, 42, 43, 43', 43", 44, 44' are thereby angled from the base region 40 so that they extends towards the backrest upholstery which is to be mounted on the front side of the support element 4, i.e., on the side of the support element 4 away from the curved element 3.

For particularly good support properties the outer contour of the individual support regions 41, 42, 43, 43', 43", 44, 44' is each formed curved, thus in particular free of sharp edges.

The support regions 43, 43', 43" moulded on the upper edge R3 of the base region 40 of the support element 4 have a different size, i.e., a different extension in the plane of the support element 4. In particular two support regions 43 have a greater extension in the direction perpendicular to the upper edge section R3 of the base region 40 than the further support regions 43', 43". Larger support regions 43 and smaller support regions 43' are thereby arranged alternately side by side and are boxed together so that they form one large surface area elastic support region for the upper back part of a vehicle occupant.

From FIGS. 1a to 4c it is further clear that the support regions 43', 44' provided in the corner sections of the base region 40, i.e., at the intersection points of the side edge sections R1, R2 with the upper and lower edge section R3, R4 each have an additional finger 43f and 44f directed inwards (i.e., to an adjoining support region 43, 44). As a result of this additional finger 43f, 44f the inner region 43a, 44a respectively of the relevant support elements 43', 44' has a larger surface area than the corresponding region 43b, 44b lying on the outside whereby the relevant inner region 43a, 44a faces an adjoining support region 43, 44 and the outer region 43b, 44b faces outwards away from the support element 4. Through this asymmetric division of the surface area it is reached that in the event of strain on the corresponding support region 43', 44' by a vehicle occupant resting against the backrest upholstery, the relevant support region 43', 44' is turned so that the region 43b, 44b on the outside is moved forwards, thus towards the backrest upholstery and thus the lateral hold is improved.

Furthermore elongated reinforcement regions in the form of reinforcement ribs 48 are provided on the support element 4 (backrest shell) and here extend in the region of the upper moulded material sections 43, namely parallel to the relevant connecting webs V from the relevant support region 43 to the base body 40. The stiffness of the upper integral moulded support regions 43 is hereby increased compared with the remaining sections 41, 42, 44. It has been seen that a reinforcement of the upper support regions 43 which are associated with the upper back or shoulder region of a vehicle occupant leads to particularly advantageous support properties. The support regions 43, 43, are thereby each time formed rotatable spring elastically about the axis formed by the relevant elongated reinforcement region 48. With the lower support regions 44 which are allocated to the lower spinal column of the vehicle occupant however a comparatively softer formation is advantageous.

It can be seen particularly in respect of FIG. 4a that the elongated reinforcement regions 48 taper toward the free end (remote from the base region 40) of the corresponding support regions 43, 43'. Here the stiffness of the relevant support region 43, 43' decreases towards its free end and the elasticity of the relevant support region 43, 43' increases towards its free end.

The reinforcement regions 48 also serve to divide the support regions 43' provided in the upper corners of the base region 40 into an inner region 43a and an outer region 43b which are separated from each other by the reinforcement region 48.

In its central region 45 the support element 4 has recesses 46 and webs 47 extending transversely to the longitudinal direction of the backrest whereby a free space is provided for the spinal column of the occupant.

As a result with the embodiment of the invention illustrated in FIGS. 1a to 4c an advantageous ergonomic adaption of the arrangement supporting the back region, particularly the lordosis region, of the occupant is achieved in that the curved element 3 on which the adjusting device 2 acts, on the one hand and the support element 4 formed as the backrest shell on the other, are arranged behind each other in two different planes. The advantageous actions of this arrangement are clear particularly from the second embodiment illustrated diagrammatically in FIG. 6.

According to FIG. 6 a tensioning or tightening element 27 in the form of a wire which can be tensioned by a drive 2' and is guided by means of a sleeve 26 from the drive 2' to the curved element 3 serves as the adjusting element for setting the curvature of curved element 3. The curved element 3 is fixed in the region of its upper end 3a on the backrest frame and is connected in the region of its lower end 3b to the tensioning or tightening element 27. If the tensioning element 27 is tightened by means of the drive 2' then this intensifies the curvature of the curved element 3 which changes for example into the state illustrated by 3' in FIG. 6. This leads at the same time to a change in the position and curvature of the support element 4 which is mounted in front of the curved element 3 and then changes for example into the state illustrated by 4' in FIG. 6.

It is decisive that the sharp curvature of the curved element 3 which is a result of the tightening of the tensioning element 27 is not transferred directly to the support element 4. Depending on how the support element 4 is connected to the backrest frame a change in the curvature of the curved element 3 leads to a different sharp change in the curvature and/or displacement of the support element 4.

With the embodiment illustrated in FIG. 6 the support element 4 can for example be hung from the backrest frame in the region of its upper and lower ends each time elastically through tensile springs. The support element 4 can therefore as a whole be moved against the action of these spring elements perpendicular to the backrest longitudinal direction L when the curved element 3 is curved. Depending on the strength of the springs through which the support element 4 is hung from the backrest frame, it thereby also results in a more or less strong change in the curvature of the support element 4. As the increase in the curvature is greater, the greater the spring force is, for the possibility of moving the support element 4 as a whole is hereby restricted.

It is decisive that the shape of the support element 4 (backrest shell) is determined not only through the curvature of the curved element 3, but is also determined through the contour of the back area of a person located on the seat. An optimum ergonomic adaption to the back region of the vehicle occupant is hereby possible with simultaneous support action in the region of the lordosis (as a result of the supporting action of the curved element 3).

Overall this arrangement enables a uniform support over a large surface area and the possibility of flexible adaptation to the individual back properties of different persons, more particularly with regard to their size.

The concrete deformation of the curved element 3 as well as the support element 4 with an adjusting of the adjusting device 2' (with the drive 20°) is decisively determined by both the type of connection between the curved element 3 and the backrest frame as well as the support element 4 and the backrest frame.

The curved element 3 which is preferably made of metal can be hung for example from the backrest frame by spring elements or wire elements. Alternatively or in addition the curved element 3 can be connected to the seat base by fixing brackets.

The support element 4 which is preferably made of metal or plastic can be connected to the curved element 3 in the region of its cross bar 30 (preferably linearly), e.g. by adhesive or rivets. Furthermore a connection of the support element 4 with the seat upholstery is possible, e.g. through adhesive, rivets or (partly) foaming into the upholstery foam. Finally the support element can also be connected to the backrest frame (preferably through further elements, such as e.g. springs).

As a result the arrangement and design of the curved element 3 and the support element 4 are to be such that the curved element 3 as a result of its spatial position which is adjustable by means of the associated adjusting device 2' (particularly its position perpendicular to the extension plane of the backrest frame) provides a base curvature of the support element 4 whereby its curvature as a whole is determined decisively by the interaction with the back part of a person seated on the corresponding vehicle seat. For this the support element 4 must have a sufficient elasticity (elastic deformability) which is preferably greater than that of the curved element 3. This can be achieved through a corresponding choice of material and shaping whereby the support element 4 furthermore has a larger surface area than the curved element 3.

A special elasticity, flexibility and adaptability of the support element 4 to the back part of a person located on the corresponding vehicle seat is thereby achieved in particular also through the support regions (support contour fingers) protruding from the edge of the base region of the support element and which have an increased elasticity compared with the base region of the support element. This is also due to the fact that the support regions are each connected to the base region of the support element through connecting regions in the form of webs (connecting regions provided with constrictions).

It can be seen in FIG. 1a to 1d that an additional support element 5 in the form of a shell for supporting the shoulder region of the occupant is provided on the backrest frame 1 above the backrest shell (support element 4). This is vertically adjustable along a toothed rod 62 by means of an adjusting device 6 having an electric drive 60 and a pinion 61.

A corresponding arrangement for adjusting the height can also be provided for the lower support element 4 which serves for the lordosis support.

The support element 5 which serves as the shoulder support can be formed in the same way as the support element 4 serving for the lordosis support, thus provided with weakened and reinforced regions as well as with material regions moulded on its edges.

What is claimed is:

1. A support element for upholstery for a motor vehicle seat, comprising:
    a base region for supporting upholstery; and
    an edge surrounding the base region;
    at least two separate adjacent support regions provided along the edge that project from the base region, wherein the support regions are each connected to the base region through a connecting region which protrudes along a first direction from the base region, wherein for at least one of the support regions the width of the connecting region perpendicular to the first direction is smaller than the maximum width perpendicular to the first direction of the relevant support region; wherein the at least two adjacent support regions comprise larger and smaller support regions that are arranged alternately along the edge of the base region that are arranged alternately along the edge of the base region and the larger support regions extend further beyond the base region than the smaller support regions so that they form one large surface area elastic support region.

2. The support element according to claim 1, wherein the support regions are spaced from each other along the edge.

3. The support element according to claim 1 or 2, wherein the support regions are each connected to the base region, but are not additionally connected to each other.

4. The support element according to claim 1, wherein the connection regions are spaced from each other along the edge of the base region.

5. The support element according to claim 1, wherein the support regions are connected to the edge region each through a connecting region which tapers at least in some sections towards the base region.

6. The support element according to claim 1, wherein the support regions are connected to the edge area each through a connecting region which is formed at least in sections as a web.

7. The support element according to claim 1, wherein the support regions extend at least in part substantially in a same plane as the edge region of the base region from which the relevant support region projects.

8. The support element according to claim 1, wherein the support regions extend in a plane oriented at least in part at an obtuse angle relative to a plane in which lies that edge region of the base region from which the corresponding support region projects.

9. The support element according to claim 1, wherein the support regions are angled at least in part away from the base region and towards the upholstery.

10. The support element according to claim 1, wherein the edge of the base region is formed by a plurality of pairs of edge sections.

11. The support element according to claim 10, wherein plurality of spaced apart support regions are provided on at least one edge section of the plurality of pairs of edge sections.

12. The support element according to claim 10, wherein a plurality of spaced apart regions are provided on each of the plurality of pairs of edge sections.

13. The support element according to claim 1, wherein the support element has reinforcement regions in the form of at least one of ribs and swages.

14. The support element according to claim 13, wherein the reinforcement regions extend at least along a part of the support regions.

15. The support element according to claim 14, wherein the support region is elastically pivotable around an axis formed by the reinforcement region.

16. The support element according to claim 13, wherein at least one reinforcement region extends from the base region of the support element into one of the at least two separate support regions so that stiffness of the reinforced support region decreases towards a free end thereof spaced away from the base region.

17. The support element according to claim 1, wherein each support region has an outer contour that is free of sharp corners.

18. The support element according to claim 1, wherein each support region has an outer contour that is curved.

19. The support element according to claim 1, wherein a support region is provided on at least one corner section of the base region and protrudes from the edge of the base region.

20. The support element according to claim 19, wherein the support region provided at the at least one corner section has a reinforcement region that defines an axis that asymmetrically divides the surface area of the divided support region so that strain on the support region will turn it about its axis.

21. The support element according to claim 20, wherein the support region provided at the corner section has a support finger which protrudes from the support region.

22. The support element according to claim 1, wherein the support element has pressure distributing areas in the form of through openings.

23. A motor vehicle seat comprising:

a seat back;

backrest upholstery on the seat back;

a base region for supporting upholstery; and an edge surrounding the base region;

at least two separate adjacent support regions provided along the edge that project from the base region, wherein the support regions are each connected to the base region through a connecting region which protrudes along a first direction from the base region, wherein for at least one of the support regions the width of the web perpendicular to the first direction is smaller than the maximum width perpendicular to the first direction of the relevant support region;

wherein the at least two adjacent support regions comprise larger and smaller support regions that are arranged alternately along the edge of the base region and the larger support regions extend further beyond the base region than the smaller support regions so that they form one large surface area elastic support region.

24. A backrest for a motor vehicle seat, comprising:

a support element for upholstery for a motor vehicle seat that comprises a base region for supporting upholstery and an edge surrounding the base region, wherein at least two separate adjacent support regions are provided along the edge that project from the base region, and wherein the support regions are each connected to the region through a connecting region which protrudes along a first direction from the base region, wherein for at least one of the support regions the width of the connecting region perpendicular to the first direction is smaller than the maximum width perpendicular to the first direction of the relevant support region; wherein the at least two adjacent support regions comprise larger and smaller support regions that are arranged alternately along the edge of the base region and the larger support regions extend further beyond the base region than the smaller support regions so that they form one large surface area elastic support region.

25. The backrest according to claim 24, further comprising:

a backrest upholstery on the base of region;

a curved element which extends along a surface of the backrest upholstery; and at least on adjusting device with which at least one of the position and curvature of the curved element is adjustable in order to set the curvature of the backrest upholstery, whereby between the curved element and the backrest upholstery a curvable support element extends which is in active connection with the curved element and which bears against the backrest upholstery in at least some sections.

26. The backrest according to claim 25, wherein the adjusting device has at least one adjusting element which is brought into active connection with the curved element, and wherein the adjusting device acts through the curved element on the support element.

27. The backrest according to claim 25 or 26, wherein the support element covers a larger surface area in a plane between a backrest frame and the seat upholstery than the curved element.

28. The backrest according to claim 25 or 26, wherein at least one of the curved element and the support element is fixed on a backrest.

* * * * *

UNITED STATES PATENT AND TRADEMARK OFFICE
CERTIFICATE OF CORRECTION

PATENT NO. : 6,918,633 B2
DATED : July 19, 2005
INVENTOR(S) : Forkel et al.

It is certified that error appears in the above-identified patent and that said Letters Patent is hereby corrected as shown below:

<u>Title page,</u>
Item [75], Inventors, delete "Andrea Bayersachs", insert -- Andrea Bauersachs --.

<u>Column 9,</u>
Lines 54-55, delete "that are arranged alternately along the edge of the base region that are arranged alternately along the edge of the base region", insert -- that are arranged alternately along the edge of the base region --.
Line 65, delete "connection", insert -- connecting --.

<u>Column 10,</u>
Line 25, before "plurality", insert -- a --.

<u>Column 12,</u>
Line 12, delete "least on", insert -- least one --.

Signed and Sealed this

Sixteenth Day of May, 2006

JON W. DUDAS
*Director of the United States Patent and Trademark Office*